W. BARBER.
TIRE TREAD.
APPLICATION FILED OCT. 20, 1915.
1,346,627.
Patented July 13, 1920.
2 SHEETS—SHEET 1.
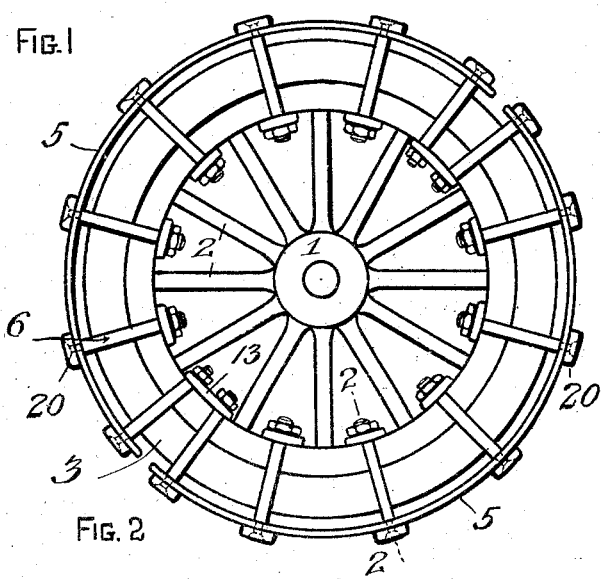
Fig. 1
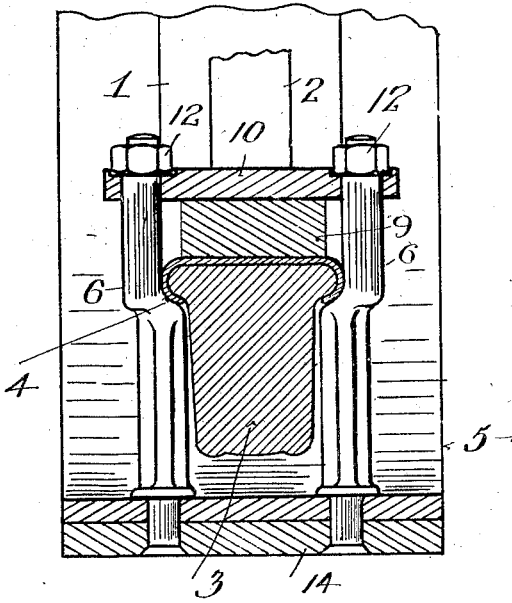
Fig. 2
Fig. 4
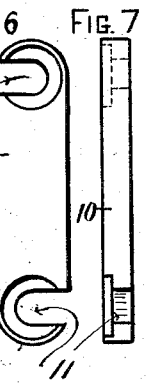
Fig. 6  Fig. 7
Fig. 5
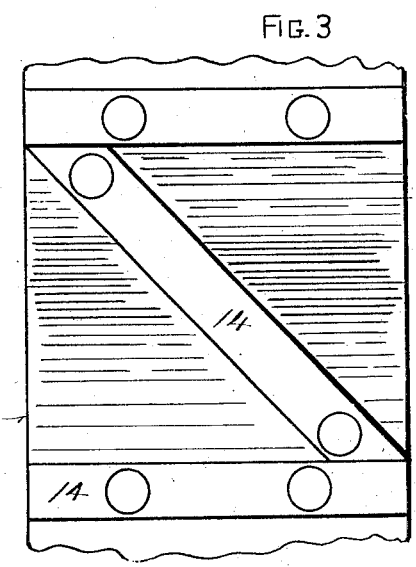
Fig. 3
INVENTOR
William Barber
BY Samuel E. Darby
ATTORNEY W. BARBER.
TIRE TREAD.
APPLICATION FILED OCT. 20, 1915.
1,346,627.
Patented July 13, 1920.
2 SHEETS—SHEET 2.
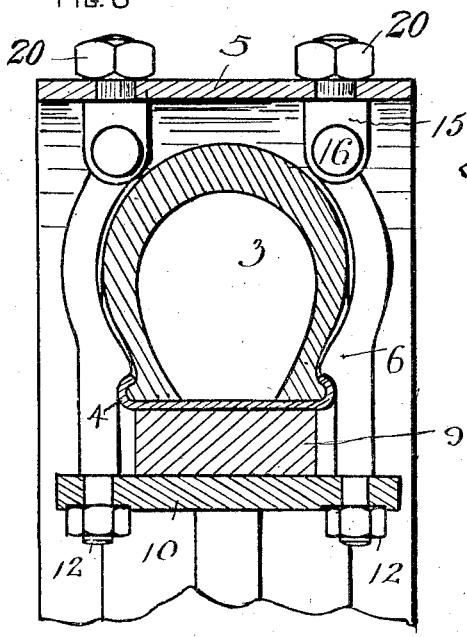
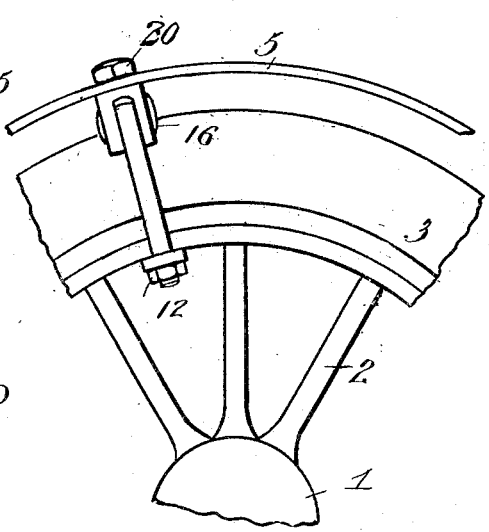
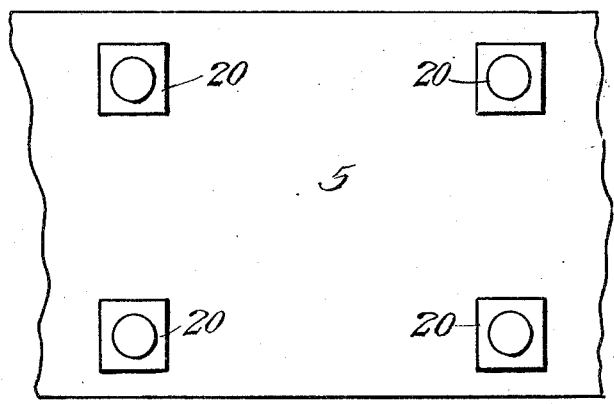
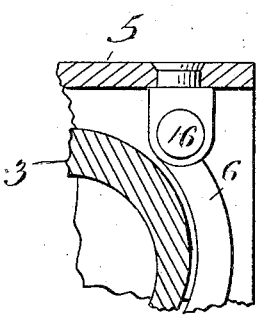
INVENTOR
William Barber
BY Samuel E Darby
ATTORNEY

UNITED STATES PATENT OFFICE.

WILLIAM BARBER, OF NEW YORK, N. Y., ASSIGNOR TO ADA S. BARBER, OF BROOKLYN, NEW YORK.

TIRE-TREAD.

1,346,627.     Specification of Letters Patent.     Patented July 13, 1920.

Application filed October 20, 1915. Serial No. 56,995.

*To all whom it may concern:*

Be it known that I, WILLIAM BARBER, a citizen of the United States, residing at New York, county of Kings, State of New York, have made a certain new and useful Invention in Tire-Treads, of which the following is a specification.

This invention relates to tire treads for automobiles.

The object of the invention is to provide a quick detachable tire tread which is simple and efficient and economical of manufacture.

A further object of the invention is to provide a tread of the class described which may be employed for farming purposes, or for driving in snow or mud.

A further object of the invention is to provide a tread which is entirely independent of the usual tire of automobiles.

Further objects of the invention will appear more fully hereinafter.

The invention consists substantially in the construction, combination, location, and relative arrangement of parts, all as will be more fully hereinafter set forth, as shown by the accompanying drawings, and finally pointed out in the appended claims.

Referring to the drawings,—

Figure 1 is a view in side elevation of a wheel equipped with a tread embodying my invention.

Fig. 2 is a sectional view taken on the line 2, 2, Fig. 1, showing a modified construction embodying my invention.

Fig. 3 is a top plan view of the same.

Fig. 4 is a detail view in elevation of a part employed in accordance with my invention.

Fig. 5 is a top plan view of the same.

Fig. 6 is a view in elevation of a similar detail of my invention.

Fig. 7 is a side view of the same.

Fig. 8 is a sectional view showing my invention as applied to a vehicle wheel employing a pneumatic tire.

Fig. 9 is a broken side view of the same.

Fig. 10 is a plan view of the same.

Fig. 11 is a broken view showing a modification of my invention as applied to the structure shown in Fig. 8.

The same part is designated by the same reference numeral wherever it occurs throughout the several views. In accordance with my invention I propose to employ an auxiliary tire for vehicles entirely independent of the usual solid or pneumatic tire employed in connection therewith. I have shown the usual vehicle wheel 1 provided with spokes 2 and the tire 3 and rim 4 therefor. I provide my auxiliary tire tread 5, preferably and as shown, in a flat surface. To secure the tread to the wheel independent of the tire 3, I provide bolts 6 formed with a projecting or curved portion or shoulder 7. Bolts 6 pass through the shield or tread 5 on opposite sides of the tire 3, the curved portion 7, thereof fitting against the tire rim 4, as shown. Threaded portions 8 of the bolts 6 project below the felly 9 of the wheel 1 and are connected together by a link 10 provided with oppositely faced cuts 11 to receive the bolt portions 8, the same being secured thereto by any suitable means such as by nuts 12.

It will be understood that the shield 5 may be formed of one piece or of a plurality of pieces, as shown in Fig. 1, in which case the sections or pieces are suitably connected together as by suitable links 13 in any well known or desired manner.

From the foregoing, it will be seen that a shield or tread constructed in accordance with my invention may be employed independently of the tire of the vehicle, as the weight of the vehicle is carried completely by the rim 4 of the wheel. It is also quickly detachable, by unscrewing the nuts 12 and removing the binding link 10, thereby making the shield or tread especially adapted for use in converting any vehicle wheel into a suitable wheel for plowing, traveling through mud, or snow. It will also be seen that, in the case of pneumatic tires, I provide an extra tire wheel which may be readily applied and used whether the tire be inflated or not.

If desired the shield may also be adapted to prevent skidding on slippery surfaces by securing thereto in any suitable manner such as by the bolts 6, non-skid strips 14. The bolts 6, may be countersunk as shown in Figs. 2 and 11, or may be provided with nuts 20, as shown in Figs. 1, 8, 9 and 10, to serve as additional purchase elements for use on hard packed snow roads or iced surfaces.

In Figs. 8 and 11, I show my invention applied to a pneumatic tire structure. In this form of my invention I propose to make the bolts in pivoted portions 6 and 15, respectively pivotally connected to each other as at 16, the portion 15, being secured to the tread 5 by bolts 14, as shown.

In this construction, the weight of the vehicle also rests on the rim 4 of the wheel 1, thereby allowing the additional or auxiliary tread or shield 5 to be entirely independent of the tire 3.

It will be understood that while I have shown and described specific structures embodying my invention, many other arrangements will occur to those skilled in the art without departing from the broad scope of my invention as defined in the claims.

Therefore, what I claim as new and useful and of my own invention and desire to secure by Letters Patent, is,—

1. The combination with a vehicle rim and tire therefor, of an auxiliary detachable tire arranged radially beyond the tread surface of said first mentioned tire and extending across the lateral width thereof, means for mounting said auxiliary tire on said wheel, including means for supporting said auxiliary tire by the rim of said wheel on opposite sides and independently of said first mentioned tire.

2. The combination with a vehicle wheel rim and tire therefor, of an auxiliary detachable tire arranged radially beyond the tread surface of said first mentioned tire, and across the width thereof, a plurality of strips extending transversely across the inside of the wheel rim, and means connecting said strips and said auxiliary tire for securing said auxiliary tire in place, and for supporting the weight of the vehicle on the periphery of the wheel rim.

3. The combination with a vehicle wheel rim and tire therefor, of an auxiliary detachable tire arranged radially beyond the tread surface of said first mentioned tire and across the width thereof, a plurality of strips extending transversely across the inside of the wheel rim, radially extending bolts connecting said strips and said auxiliary tire, and means for transmitting the weight of the vehicle through said bolts to the periphery of the wheel rim.

4. The combination with a vehicle wheel rim and tire therefor, of an auxiliary detachable tire arranged radially beyond the tread surface of said first mentioned tire and across the width thereof, a plurality of strips extending transversely across the inside of the wheel rim, radially extending bolts positioned on opposite sides of said first mentioned tire and connecting said strips and said auxiliary tire, and means for transmitting the weight of the vehicle through said bolts to the periphery of the wheel rim.

5. The combination with a vehicle wheel rim and its tire, of an auxiliary tire arranged across the tread surface of said wheel tire, supporting arms connected to said auxiliary tire on opposite sides of said wheel tire and bearing on said rim to thereby take the weight of the vehicle on the tire rim and remove the weight thereof from said tire, and means for detachably clamping said arms to the wheel.

6. The combination with a wheel and its tire, of an auxiliary tire arranged across the tread surface of said wheel tire, supporting arms pivotally connected to said auxiliary tire on opposite sides of said wheel tire and bearing on the opposite sides of said rim, and means for detachably clamping said arms to the wheel.

7. The combination with a wheel and its tire, of an auxiliary tire, supporting arms provided with hinged members connected thereto, the ends of said hinged members adjacent said auxiliary tire being countersunk in the surface of said auxiliary tire, and means for detachably clamping said arms to the wheel.

In testimony whereof I have hereunto set my hand on this 18th day of October, A. D. 1915.

WILLIAM BARBER.